United States Patent Office 3,425,095
Patented Feb. 4, 1969

3,425,095
INJECTION MOLDING APPARATUS
Alexander Kotek, Batawa, Ontario, Canada, assignor to Bata Shoe Company, Inc., Belcamp, Md.
Filed July 18, 1966, Ser. No. 565,777
Claims priority, application Canada, July 22, 1965, 936,520
U.S. Cl. 18—30       11 Claims
Int. Cl. B29f 1/00; A43d 3/02; B29c 1/00

ABSTRACT OF THE DISCLOSURE

Injection molding apparatus including top and side molds and an article carrying last to which molding material is to be applied. The molds and lasts are mounted to close together to define a cavity adjacent the last with the side molds providing therebetween when closed an injection port extending from the cavity to the mold exterior. An injection unit having a heated valve and a nozzle has the valve pivotally mounted to pivot into alignment with the injection port during closing of the molds and last and to pivot in substantial alignment with the last during movement of the last following injection and of contact with the side molds providing the injection port.

---

The present invention relates to injection molding apparatus, and more particularly to apparatus for the injection molding of footwear.

With the rise in popularity of injection molding processes for the production of footwear resulting in increased output and reduced production costs, many shoe presses now owned by various manufacturers have fallen into general disuse. In this older type press, a metal or wooden shoe last having shoe components lasted thereon is inserted into a cavity having top and side molds, and then mechanically, hydraulically or pneumatically close upon the last and the shoe components molded to shape. The molds and lasts may or may not be heated, depending upon the type of shoe to be made and the methods and adhesives employed in attaching the various shoe components together.

In present injection molding techniques a last upon which components of a shoe have been lasted is inserted into an opening defined by a sole mold and two side molds, the side molds close tightly against the sole-heel periphery of the last and a cavity is left between the last and the sole mold to receive heated thermoplastic molding material which is injected into the cavity under pressure and which bonds to the sole area of the lasted upper to form a shoe sole.

It is the main object of the present invention to provide injection molding apparatus for footwear and particularly injection molding apparatus for use in combination with existing shoe pressing or molding machines, whether the machines be of the single or double or more last receiving type:

One particular object of the present invention is to provide injection molding apparatus for use in combination with shoe pressing or molding machines having dual last receiving cavities, such as disclosed in Canadian Patent No. 568,981 entitled "Shoe Molding Machines" in the name of Bata Shoe Company of Canada Limited, assignee of V. A. Vdolek. The machine described in this patent basically comprises a stationary center mold, both sides of which have a recessed shape corresponding to the exterior shape of the side of the boot or shoe to be produced thereby. Two side molds positioned laterally of the center mold are adapted to close on the center mold simultaneously with the lowering of a top or sole mold to mold the shoe components arranged on a last positioned between said molds.

It is one of the principal objects of the invention to provide an injection molding apparatus for use in combination with the machine described in Canadian Patent No. 568,981 which permits use of the machine, with slight modifications, in combination with injection molding techniques, said apparatus basically comprising independent pivotally mounted injection barrels having associated injection nozzles which may be fin-cooled for engagement with each of the molding cavities of the machine. Each injection barrel is heated and has longitudinally disposed therein a molding material extruding screw for the movement of molding material from a reservoir supply to the injection nozzle and hence into a molding cavity wherein the molding material solidifies to form part of a molded shoe. The injection nozzles may be provided with fins to assist in keeping the nozzle cool to facilitate hardening of the molding material in the nozzle to provide a positive separation of the solid and liquid molding material within the nozzle after each injection cycle when the last and shoe are removed from the molding cavity, with the solid material in the nozzle being withdrawn as a tail or sprue extending from the molded article.

It is a further object of the present invention to provide injection apparatus adapted for use with single last pressing or molding machines to enable these machines to be used as injection molding machines.

While the principal objects of the present invention are to provide apparatus for use in combination with existing shoe pressing or molding machines, the apparatus is not limited to such a restricted application and may form an integral part of newly produced complete injection molding machines.

Although the preferred application of the present invention is the formation of a unit sole (heel and sole combination) upon a shoe upper mounted upon a metal or wooden last, the present apparatus is equally applicable to the molding of a unit sole blank which may later be attached to a shoe upper by adhesives, stitching or other means.

These and other objects will become apparent from the following description taken in conjunction with the accompanying drawings wherein.

Figure 1:
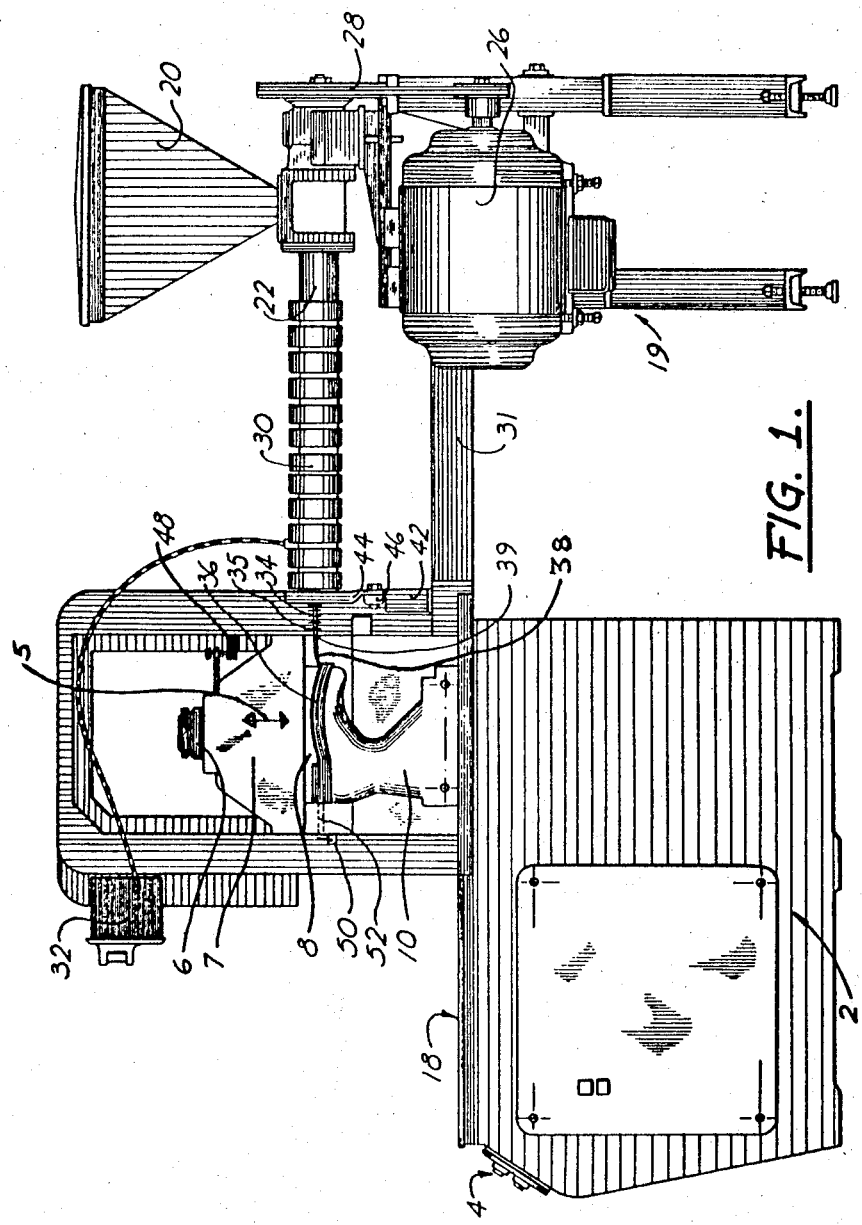
FIGURE 1 is a diagrammatic side elevation with mold components shown in section of the apparatus according to the invention illustrating the side and top (sole) molds of a shoe press in molding position, and an injection barrel and nozzle in position for injecting molding material into a cavity defined by the sole portion of a lasted shoe and the top sole mold, and the side molds.
Figure 2:
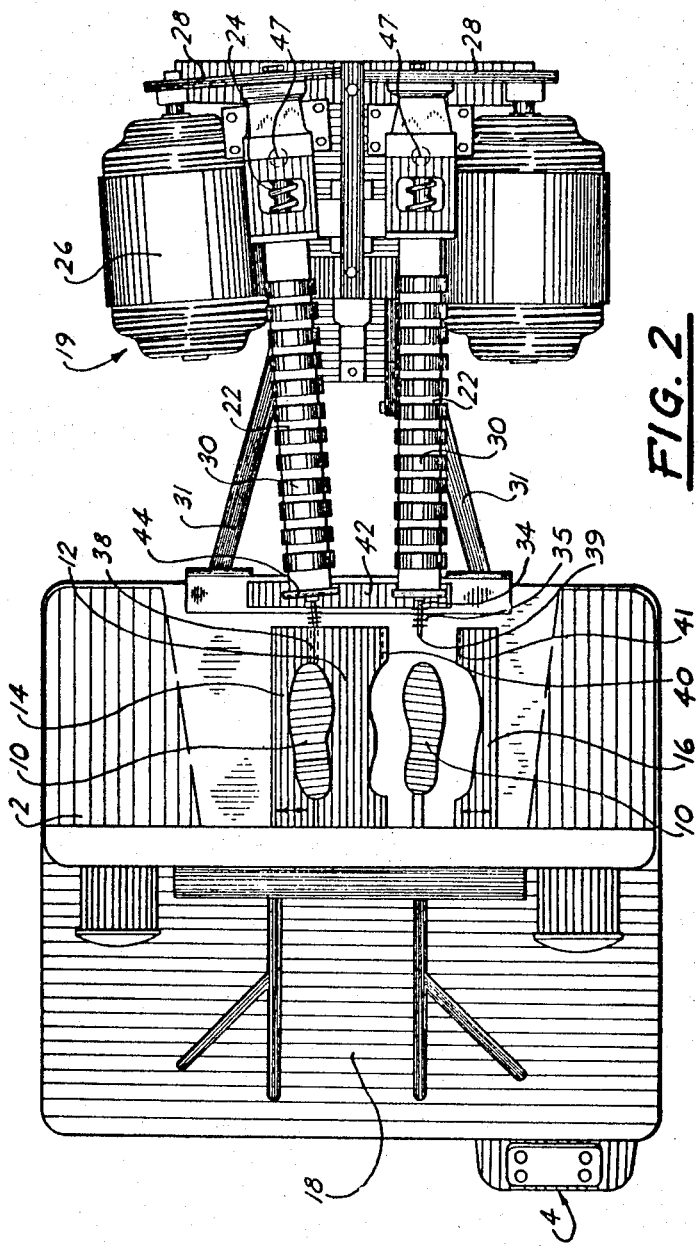
FIGURE 2 is a diagrammatic plan view of the apparatus shown in FIGURE 1 having two shoe pressing cavities, the molds defining one cavity being in shoe pressing position and the molds defining the other cavity being in open position.

In FIGURES 1 and 2 a shoe molding machine having dual pressing cavities is shown generally at 2. This machine may be similar to the shoe pressing machine disclosed in Canadian Patent No. 568,981. The machine basically comprises machine controls 4 and supporting members 6 to which a top mold carrying member 7 and a top or sole mold 8 having a shape in reverse to the desired shape of the finished shoe is affixed. The mold 8 is adapted for movement toward and away (see arrow 5 in FIGURE 1) from an inverted last 10 by activation of pneumatic or hydraulic mechanism (not shown) disposed within the body of machine 2. In FIGURE 2, center stationary mold is shown at 12 and two side molds at 14 and 16. Side mold 14 is shown disposed tightly against the center mold 12 and last 10, and side mold 16 in its open non-molding position. The lateral movement of the side molds 14 and 16 toward and away from the center mold 12 with simultaneous vertical movement of sole mold 8, and the insertion of a last upon which are positioned shoe components into the pressing cavities are described in Canadian Patent 568,981 and further discussion here is not necessary.

In FIGURE 2, side mold 14 is shown in molding position and side mold 16 in open or non-molding position for purposes of illustration only, and it is usual in machines of this type that the side molds either both be closed or both open.

An injection molding apparatus is shown generally at 18 and a hopper containing molding injection material at 20 in FIGURE 1, and is positioned on top of an injection barrel 22. Disposed longitudinally within barrel 22 is an extruding screw which is rotated by motor 26 via drive 28. The hopper 20 has been removed in FIGURE 2 and portions of the extruding screws which run the full length of the barrels are shown at 24. Barrel heating units 30 are placed along the barrels to heat and melt the molding material being conveyed therethrough for injection. In FIGURE 1 a temperature indicator and regulator is shown at 32 for controlling the temperature of the material within the barrel.

Although the extruder barrel 22 is shown as being provided with an extruder screw 24, it is possible to use instead a piston ram type injection device (not shown). With this latter type device, a charge of molten molding material is positioned within an extrusion barrel and a piston longitudinally displaceable within the barrel forces the material through the injection nozzle and into the molding cavity.

The injection apparatus is fastened to the press by arms 31 and the relative positioning of the press with respect to the injection apparatus may be regulated by appropriate mechanism (not shown) carried by the arms.

An injection nozzle 34 is provided at the end of the injection barrel, and cooling fins or ribs 35 may be provided on the nozzle for cooling purposes. These fins are merely an adaptation of the known technique of dissipating heat by increasing the surface area to the nozzle of an injection nozzle. The inside surface of the side molds 14 and 16 and both sides of the center mold are provided with horizontally positioned semi-circular grooves 40 and 41 (see FIG. 2) which extend from cavity 36 provided between the sole mold 8 and the top of the last 10 which carries a lasted shoe (not shown) to the exterior of the mold members. When the side mold closes against the center mold the grooves correspond to form an injection passage or port having more or less circular cross-section. This injection port is shown by numeral 38 in FIGURES 1 and 2, and the semi-circular grooves which together form port 38 are indicated at 40 and 41 in FIGURE 2.

The machine 2 may be provided with a smooth track 42, and the nozzle end of the barrel 22 is provided with a front support member 44 having a bearing wheel 46 to roll on track 42 (see FIGURE 1).

Each barrel 22 is pivotally mounted (see pivot 47 in dotted lines in FIGURE 2) at its hopper end for rotational movement in a horizontal plane about pivot 47 from its non-injection position shown at 22′ in FIGURE 2, to the injection position shown at 22″. The reason for pivoting the barrel will be discussed in detail later in the disclosure.

When a shoe is positioned upon last 10 and within the molding cavity and the mechanism for closing the side molds and lowering the top molds is activated, tip 39 of the injection nozzle 34 is contacted by the semi-circular groove 41 provided in the side mold as the side molds move inwardly, and the injection barrel is pivoted at 47 towards the center mold. When the center and side molds are in molding position the barrel is in position 22″, and the tip 39 of the nozzle is positioned within grooves 40 and 41 in injection port 38 in injecting position.

After injection, the top and side molds open, and the barrel swings to the position shown at 22′ in FIGURE 2. The barrel may be returned to position 22′ by spring action or any appropriate means.

The molding material passing through the injection barrel is heated to injection temperature by heating units 30 and consequently it is still very hot when it is ejected from the nozzle into the molding cavity. The heat of the plastisol is of course transferred to the nozzle, and the nozzles may be provided with cooling fins to dissipate as much heat as possible.

When a lasted shoe is inserted into one of the molding cavities and the press mechanism activated to close the top mold and side mold thereon, the action of the side mold against the injection nozzle tip 39 pivots the barrel at 47 to the position shown at 22″ in FIGURE 2. When the molds close on the tip 39 of nozzle 34, injection of plastisol material is commenced by the activation of motor 26 to rotate the extruding screw 24 to force hot holding material through nozzle 34, mold port 38 and into the cavity 36 defined between the side and center molds and the sole of the lasted shoe and the top mold. The injection of molding material continues until stopped by a time sequence control and/or limit switches. One form of such a limit switch is shown at 48 in FIGURE 1. As the cavity 36 becomes filled with molding material and the extruding screw 24 continues to inject more material the pressure within cavity 36 increases and this pressure tends to urge mold 8 and last 10 apart. When the cavity 36 is full, top mold 8 rises just slightly but sufficiently to operate limit switch 48 which in turn is operable to stop motor 26 and cease rotation of extruding screw 24.

In the molding machine shown in FIGURES 1 and 2, the termination of injection of each barrel is independent of the other. With this arrangement it is necessary to have a limit switch 48 positioned above each of the sole molds 8 to ensure that each mold cavity is completely filled prior to the opening of the press and the removal of the lasts.

Another type of limit switch is shown at 50. This switch is arranged in association with a port or vent 52 provided in a mold and through which molding material will flow when the remainder of the cavity 36 has been filled. Flow through vent 52 causes activation of switch 50 to stop motor 26 and further injection into the respective cavity.

When injection is completed, the molding material in the cavity is allowed to set for a short time in the comparatively cool molds, and the molds are then opened and the lasted shoes removed to be replaced in the mold cavity by another last upon which shoe uppers have been positioned ready for molding.

The nozzles remain comparatively cool duriing the insertion cycles and when the material in cavity 36 solidifies, solidification of at least a portion of the molding material remaining in the injection nozzle also occurs. The molding material in cavity 36 is of course continuous with the material in port 38 and in nozzle 34 so that when last 10 is removed from the molding cavity, a tail or sprue of material formed in port 38 and partly in nozzle 34 attached to the molded shoe is also removed, thus cleaning the port and the nozzle for the next injection step. The cooling of nozzle 34 is of course to enable setting of the molding material therein for easy removal when the last is removed, and cooling fins 35 assist in the cooling.

There is always a tendency for the viscous heated material in the barrel to advance into the nozzle 34 after the injection step is completed and solidify and clog at the end of the nozzle resulting in unsatisfactory subsequent injection. By removing the sprue from the nozzle, it has been found that the lasted shoe that has been molded may be removed and replaced with a new lasted shoe for molding in less time than it takes for the molding material to advance from the barrel portion to the tip 39 of the nozzle, thus eliminating the formation of solidified molding material at the end of the nozzle which results in unsatisfactory subsequent molding.

The operation steps may be summarized as follows:

(1) A last upon which the upper of a shoe has been lasted is inserted into a molding cavity of a shoe press.

(2) The mechanism of the press is then operated to close the side mold against the lasted shoe and against the center mold at which time the injection barrel and nozzle are pivoted into injection position and the top (sole) mold is lowered to within the desired distance from the lasted shoe.

(3) The injection motor is activated and heated molding material is conveyed along an injection nozzle and into a cavity defined by two side molds, the top mold and the sole surface of a lasted upper.

(4) When the cavity is filled injection is terminated by a timed sequence control or by the activation of limit switches.

(5) After a short cooling and setting period the molds are opened and the molded shoe with sprue attached is removed and replaced by another lasted shoe for molding, during which time the injection barrel has pivoted to a position to maintain substantial alignment with the lasted shoe.

(6) The molding cycle is repeated.

The activation of the mechanism of the press to close the molds into injection position, the activation of the motor to commence injection and subsequently the stopping of the motor to cease injection, and the opening of the molds for removal and replacement of a lasted shoe, may all be manually controlled by the operator of the machine, or may be automatically controlled in timed sequence by known means, and the stopping of the motor to cease injection may be controlled by limit switches as above explained.

In the above discussion repeated reference has been made to molding material. It will be appreciated that this molding material may be a suitably compounded plastisol composition, polyvinyl chloride mixtures, thermoplastic rubber or "dry blend" materials such as the polyvinyl chloride resin powders presently available.

Also the description relates solely to the injection of one molding material, but the pivoting barrel arrangement makes it readily applicable to molding techniques wherein molding materials of various colors and/or characteristics may be injected.

In addition, by employing a pivoting barrel arrangement it is not necessary to employ additional mechanism to reciprocate the injection apparatus toward and away from the molding cavity as is necessary in known injection apparatus.

Figure 3:
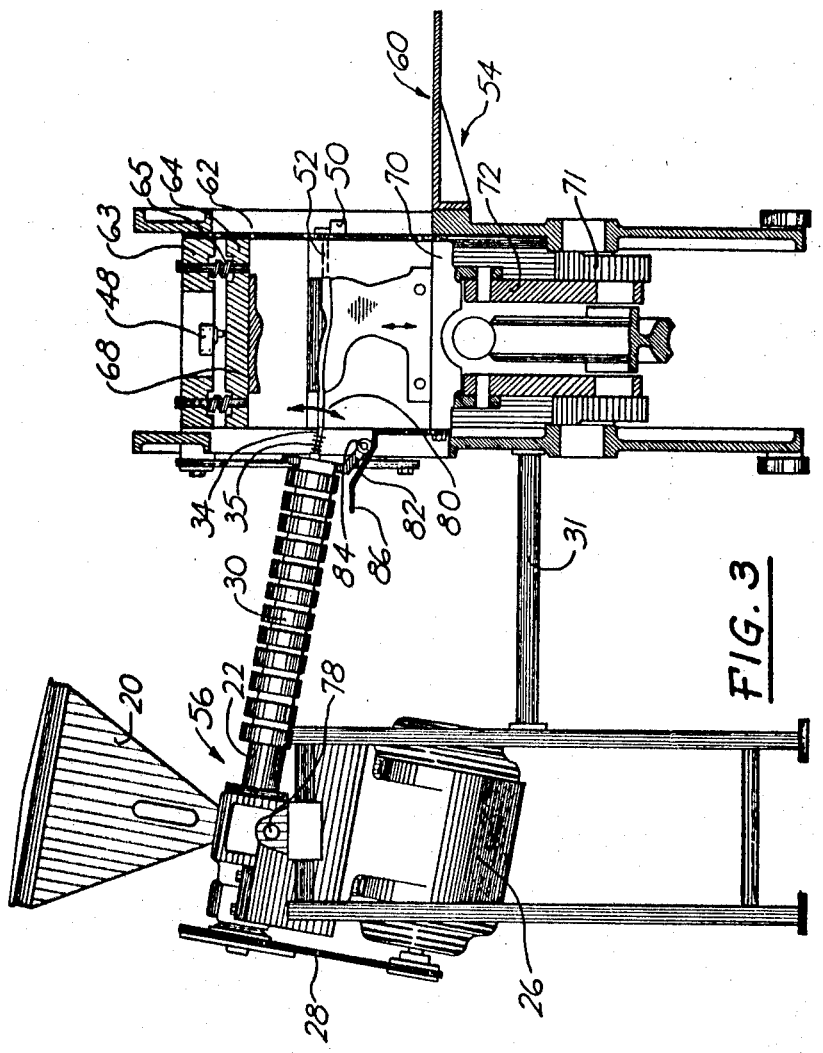
FIGURE 3 is a diagrammatic side elevation of another embodiment of the present invention illustrating a single cavity pressing machine in open position, and wherein the injection barrel is pivoted for vertical movement.
Figure 4:
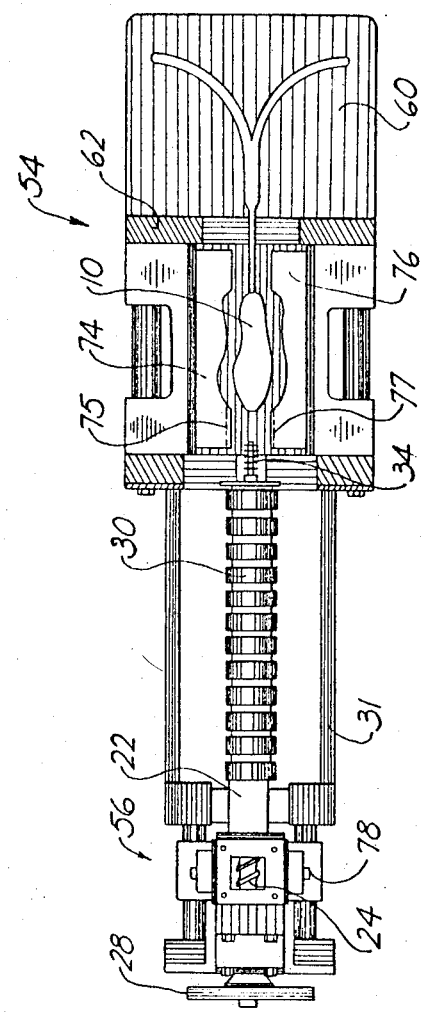
FIGURE 4 is a diagrammatic plan view of the apparatus shown in FIGURE 3.
Figure 5:
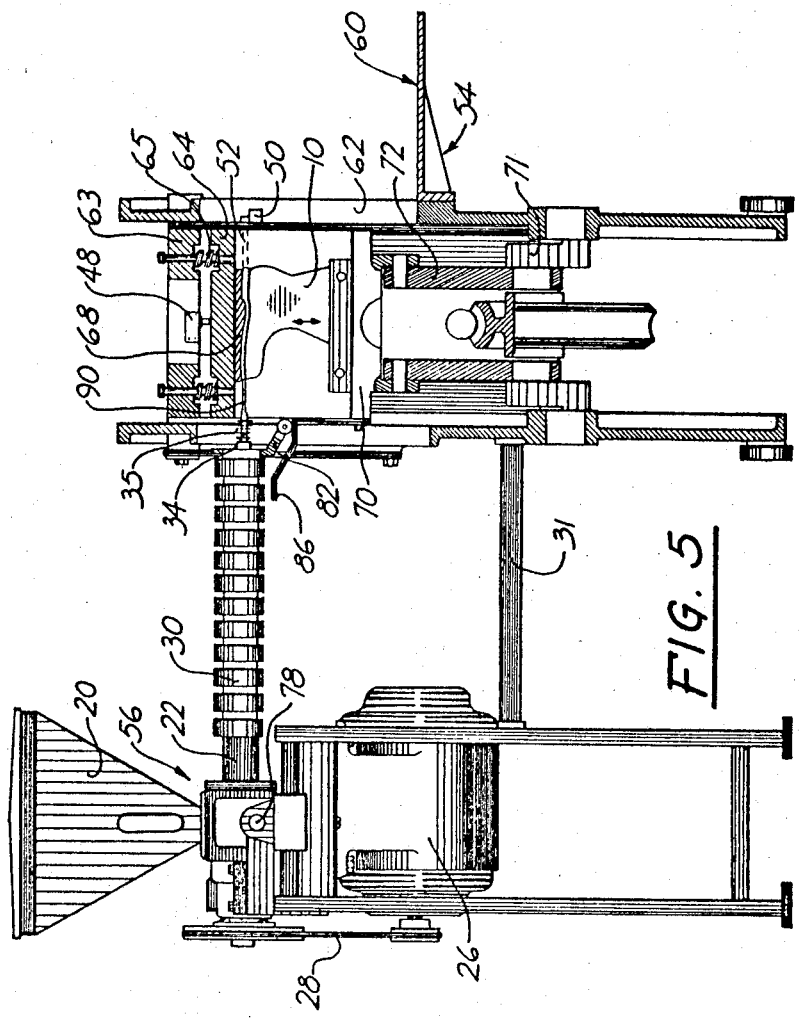
FIGURE 5 is a diagrammatic side elevation of the apparatus shown in FIGURE 3, but wherein the barrel is positioned in injecting position.

Another embodiment of the invention is shown in FIGURES 3–5 in which a pivotally mounted injection barrel is shown mounted in combination with a mechanically operated shoe press having only a single pressing chamber or cavity, similar to many mechanically operated shoe presses now in the possession of various shoe manufacturers. The basic difference between the press shown in FIGURES 1 and 2 and the press of FIGURES 3 to 5, apart from the number of molding chambers, is that in FIGURES 1 and 2 the lasts 10 remain stationary and the top molds lower to meet the lasts, whereas in FIGURES 3–5 the top mold remains relatively stationary vertically and the last is mounted for vertical reciprocal movement. This difference in the two presses makes it necessary to have the injection barrel pivotable in a vertical plane when employed with the press of FIGURES 3–5 and pivotable in a horizontal plane when used with the press of FIGURES 1 and 2.

In FIGURES 3–5 a single cavity shoe press is shown generally at 54 and an injection molding apparatus at 56. The press consists of a base unit having a work table 60 and supporting column 62. Mounted on supporting column 62 is a mold plate or carrier 64 which carries a top mold member 68. A last 10 carrying a lasted shoe upper is positioned on an elevator platform 70 which is capable of reciprocal vertical movement under the influence of a connecting rod 72 driven by a crankshaft 71. While a mechanical drive system is shown, it will be understood that the invention is equally applicable to hydraulically or pneumatically driven systems as well.

In FIGURE 4, side molds 74 and 76 are shown in open position, and the side molds are mounted to close together in molding position as the last 10 is raised to the injecting position.

The injection molding apparatus shown generally at 56 consists of an injection barrel 22, molding material hopper 20, heating units 30, motor 26, drive 28, and injection nozzle 34, which may be finned as at 35 to assist nozzle cooling. This apparatus is mounted for pivotal movement about a pivot pin indicated at 78 in FIGURES 3 and 5, enabling vertical reciprocal movement of nozzle 34 in the direction of arrow 80 in FIGURE 3. The front of the barrel is provided with a support member 82 which carries a wheel 84 which rides upon a support tongue 86 fixedly attached to elevator platform 70. The wheel 84 rides on tongue 86 under the influence of gravity, and as platform 70 moves in its vertical reciprocal path it is apparent that a corresponding substantial vertical reciprocal movement will be imparted to the end of the barrel carrying injection nozzle 34.

In FIGURE 3 the barrel is shown in its lowered non-injecting position, and upon activation of connecting rod 72 to raise last 10 to within a predetermined distance from top mold 68, the tongue 86 acting on wheel 84 pivots the barrel at 78 to the injecting position shown in FIGURE 5. The inside surfaces of side molds 74 and 76 are provided with corresponding semi-circular grooves 75 and 77 (see FIGURE 4) which together form injection port 90 as disclosed in FIGURE 5.

As the side molds rise and close on a lasted shoe on last 10 there is a pivotal upward movement imparted to nozzle 34 due to the simultaneous rising of barrel 22 by tongue 86. Grooves 75 and 77 close upon the tip 39 of nozzle 34, and injection of the molding material through nozzle 34, port 90 and into sole cavity 36 is commenced. The mold support member 64 may be supported by member 63 which is fixedly attached to columns 62 by means of springs 65. An increase in pressure within the molding cavity raises mold 68 and support member 64 against the action of springs 65 to contact limit switch 48 to stop motor 26 and terminate injection. Termination of injection can also be effected by activation of limit switch 50 which stops motor 26, as described above with reference to FIGURES 1 and 2.

After injection, platform 70 and last 10 are lowered with a simultaneous parting of side molds 74 and 76 and the downward pivoting of barrel 22 to the position shown in FIGURE 3, the barrel pivoting downwardly with the lowering of last 10 to ensure that the solidified plug in the nozzle will be removed with the withdrawal of last 10.

The sequence of operational steps, and manual or automatic operation may be as above outlined.

In both of the shoe molding presses shown in FIGURES 1 and 2 and 3–5, the lasts bearing the shoe components to which a heel and sole is molded undergo movement after injection other than a direct withdrawal from the molding cavities. In the case of the machine of FIGURES 1 and 2, the lasts are moved laterally away from the center mold before being withdrawn from the cavity, and in the case of FIGURES 3–5 the last is lowered vertically prior to its withdrawal from the molding cavity. As above explained, to ensure satisfactory subsequent molding it is necessary that the material solidifying in the injection nozzles be removed as a tail or sprue on the molded article. To ensure that the portion of material solidifying in the nozzle is removed with the withdrawal of the last, and that there is no sprue "breakage" at the tip of the nozzle, it has been found advantageous to pivot the injection barrels as above described to maintain the injection nozzle in substantial alignment with the last. This ensures that the material solidifying in the nozzle will be withdrawn as the last is withdrawn from the molding cavity, thus assuring satisfactory subsequent injection.

In cases, however, where the barrel is withdrawn directly away from the molds after injection and solidification, as in the case of the manufacture of unit soles employing laterally movable split molds, it has been found unnecessary to employ the pivoting barrel arrangement and the barrel may be held stationary.

The invention is not to be confined to any strict conformity to the showings in the drawings but changes and modifications may be made therein so long as such changes or modifications mark no material departure from the spirit and scope of the appended claims.

What is claimed is:

1. An injection molding apparatus comprising in combination a molding unit defined by side molds mounted to close together to define a molding cavity, the inside surface of which corresponds to the outside surface of an article to be molded therein, a top mold and a last carrying an article to which molding material is to be applied, said molds and said last being mounted to move and close together to define a cavity adjacent said last, means for closing said molds and said last, an injection unit including a heated injection barrel, and means for conveying molding material along said barrel, the side molds being provided with semi-circular horizontally positioned grooves forming an injection port extending from said cavity to the exterior of the molds when the side molds are closed together, and an injection nozzle mounted on one end of said barrel and cooperating with said injection port, said barrel being pivotally mounted, the closing of the molds and the last pivoting the barrel and the nozzle in alignment with said injection port, with the barrel pivoting during opening of the molds and the last after injection to remain in substantial alignment with the last during movement thereof.

2. The apparatus as claimed in claim 1 wherein said nozzle is provided with cooling fins.

3. The apparatus as claimed in claim 1 wherein said last is mounted for horizontal reciprocable movement and said barrel is pivotally mounted for rotation in a horizontal plane.

4. The apparatus as claimed in claim 1 wherein said last is mounted for vertical reciprocal movement, and said barrel is pivotally mounted for rotation in a vertical plane.

5. The apparatus as claimed in claim 1 wherein the tip of the injection nozzle is received within the port provided by the closing of the side molds.

6. An injection molding apparatus comprising in combination a molding unit having a vertically reciprocal last carrying an article to which molding material is to be applied, a sole mold mounted above said last and a side mold mounted on each side of the last, means for vertically moving said last to within a predetermined distance from said sole mold, and means for closing said side molds against said last and sole mold thereby forming a cavity between said last and sole mold, and said side molds, the side molds being provided with semi-circular horizontally positioned grooves forming an injection port extending from said cavity to the exterior of the molds when the side molds are closed together, an injection unit including a heated injection barrel, an extruding screw longitudinally positioned in said barrel, an injection nozzle mounted at one end of said barrel adapted to be received within said injection port, cooling fins for said nozzles, means mounting said barrel for pivotal movement in a vertical plane, means for pivoting said barrel during upward movement of said last to raise said nozzle into engagement with said injection port, means for driving said extruding screw to convey molding material along said barrel and inject said material through said nozzle and the injection port into said cavity, and means for terminating injection when the molding material within the cavity reaches a predetermined pressure, the barrel pivoting during opening of the molds after injection to maintain the nozzle in substantial alignment with the last during lowering of the last.

7. An injection molding apparatus comprising in combination a molding unit having a stationary center double-sided mold and side molds mounted for movement toward said center mold positioned on each side of said center mold, a vertically reciprocal sole mold mounted above and between said center mold and each of said side molds, a last carrying an article to which molding maetrial is to be applied mounted beneath each of said sole molds, means operable to lower said sole molds to within a predetermined distance above said lasts and operable to close said side molds against said lasts and the center mold thereby forming a cavity between said lasts and sole mold, the side molds and the center molds being provided with semi-circular horizontally positioned grooves forming an injection port extending from said cavity to the exterior of the molds when the molds are closed together, an injection unit including two heated injection barrels, an extruding screw longitudinally positioned in each barrel, an injection nozzle mounted at one end of each barrel adapted to be received within the injection ports formed between the center mold and each side mold, cooling fins for each nozzle, means mounting each barrel at its end remote from the nozzle for pivotable movement in a horizontal plane, means for pivoting said barrels during closing of said side molds against said center mold to move said nozzles into engagement with said injection ports, means for driving said extruding screws to convey molding material along said barrels and inject said material through said nozzles and said injection ports into said cavities, and means for terminating injection when the molding material within the cavities reaches a predetermined pressure, the barrels pivoting during opening of the molds after injection for maintaining the nozzles in alignment with said last during movement of the side molds and said lasts away from said center mold.

8. The apparatus as claimed in claim 6 in which the barrel is supported at it nozzle end and is pivoted in a vertical plane by reciprocal movement of the last.

9. The apparatus as claimed in claim 7 wherein each barrel is supported at its nozzle end and is pivoted by contact fo the semi-circular grooves against the nozzles.

10. The apparatus as claimed in claim 1 wherein at least two injection barrels are mounted in combination for the injection of molding material of different characteristics.

11. The apparatus as claimed in claim 1 wherein the molding material is conveyed along the extruder barrel by a reciprocal piston disposed within said barrel.

References Cited

UNITED STATES PATENTS

| | | |
|---|---|---|
| 2,533,468 | 12/1950 | Jurgeleit. |
| 2,600,507 | 6/1952 | Leahy et al. |
| 3,025,568 | 3/1962 | Hardy. |
| 3,036,244 | 4/1963 | Hehl. |
| 3,109,200 | 11/1963 | Ludwig. |
| 3,117,348 | 1/1964 | Rees. |
| 3,314,640 | 4/1967 | Snow. |

FOREIGN PATENTS 159,631    12/1963    Japan.

WILBUR L. McBAY, *Primary Examiner.*

U.S. Cl. X.R.

18—17, 42